United States Patent
Kaneko

(10) Patent No.: US 11,387,711 B2
(45) Date of Patent: Jul. 12, 2022

(54) VEHICLE MAIN ELECTRIC MOTOR

(71) Applicant: MITSUBISHI ELECTRIC CORPORATION, Tokyo (JP)

(72) Inventor: Kenta Kaneko, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 703 days.

(21) Appl. No.: 16/068,731

(22) PCT Filed: Mar. 22, 2016

(86) PCT No.: PCT/JP2016/058957
§ 371 (c)(1),
(2) Date: Jul. 9, 2018

(87) PCT Pub. No.: WO2017/163306
PCT Pub. Date: Sep. 28, 2017

(65) Prior Publication Data
US 2019/0027999 A1 Jan. 24, 2019

(51) Int. Cl.
*B61C 9/50* (2006.01)
*H02K 9/06* (2006.01)
*H02K 9/26* (2006.01)

(52) U.S. Cl.
CPC ............ *H02K 9/26* (2013.01); *B61C 9/50* (2013.01); *H02K 9/06* (2013.01)

(58) Field of Classification Search
CPC .. H02K 9/26; H02K 9/06; H02K 9/00; H02K 9/02; H02K 9/04; H02K 9/08; H02K 9/16;
(Continued)

(56) References Cited

U.S. PATENT DOCUMENTS 3,666,978 A * 5/1972 Renner ................ H02K 9/26
310/62
7,629,717 B2 * 12/2009 Kanei ................. H02K 9/08
310/64
(Continued)

FOREIGN PATENT DOCUMENTS

CN 1722576 A 1/2006
JP 58-19143 A 2/1983
(Continued)

OTHER PUBLICATIONS

Office Action dated Mar. 6, 2020, issued in corresponding Indian Patent Application No. 201847032974, 5 pages.
(Continued)

*Primary Examiner* — Gary A Nash
(74) *Attorney, Agent, or Firm* — Buchanan Ingersoll & Rooney PC

(57) ABSTRACT

An air intake port has an opening part and an air intake port cover forming an air flow channel from the opening part to the air intake port. The air intake port cover has a guide plate to block the opening part and the air intake port from each other and leave an air flow path between the guide plate and an outer perimeter surface facing a vehicle body, a discharge port formed in the outer perimeter surface, a discharge port cover separating the discharge port and the air intake port from each other, and leaving an air flow path from the opening part to the discharge port, and a pair of cylindrical members, one end of each being connected to two holes formed in the discharge port cover, and the other ends facing each other in a travel direction, and tapering in cross-sectional area.

20 Claims, 21 Drawing Sheets

(58) Field of Classification Search
CPC .......... H02K 5/20; H02K 5/203; H02K 5/207; B61C 9/50
See application file for complete search history.

(56) References Cited

U.S. PATENT DOCUMENTS

| | | | | |
|---|---|---|---|---|
| 7,683,510 | B2* | 3/2010 | Pellegrino | H02K 9/18 310/58 |
| 7,701,096 | B2* | 4/2010 | Noda | B60L 3/0061 310/57 |
| 7,714,467 | B2* | 5/2010 | Pfannschmidt | H02K 5/20 310/58 |
| 8,487,490 | B2* | 7/2013 | Dutau | H02K 9/06 310/63 |
| 8,536,744 | B2* | 9/2013 | Nagayama | H02K 9/18 310/59 |
| 8,541,923 | B2* | 9/2013 | Leiber | H02K 16/02 310/214 |
| 8,987,952 | B2* | 3/2015 | Dutau | H02K 9/06 310/62 |
| 2006/0012256 | A1 | 1/2006 | Takeuchi et al. | |
| 2012/0062057 | A1* | 3/2012 | Nagayama | H02K 9/14 310/59 |
| 2015/0000549 | A1* | 1/2015 | Nagayama | H02K 9/06 104/288 |

FOREIGN PATENT DOCUMENTS

| | | |
|---|---|---|
| JP | 63-28244 A | 2/1988 |
| JP | 2000-152561 A | 5/2000 |
| JP | 2003-274609 A | 9/2003 |
| JP | 2004-194447 A | 7/2004 |
| JP | 2016-100274 A | 5/2016 |

OTHER PUBLICATIONS

International Search Report (PCT/ISA/210) dated Jun. 28, 2016, by the Japanese Patent Office as the International Searching Authority for International Application No. PCT/JP2016/058957.

Written Opinion (PCT/ISA/237) dated Jun. 28, 2016, by the Japanese Patent Office as the International Searching Authority for International Application No. PCT/JP2016/058957.

Office Action dated May 8, 2018, by the Japanese Patent Office for Application No. 2018-506652.

* cited by examiner

FIG.6
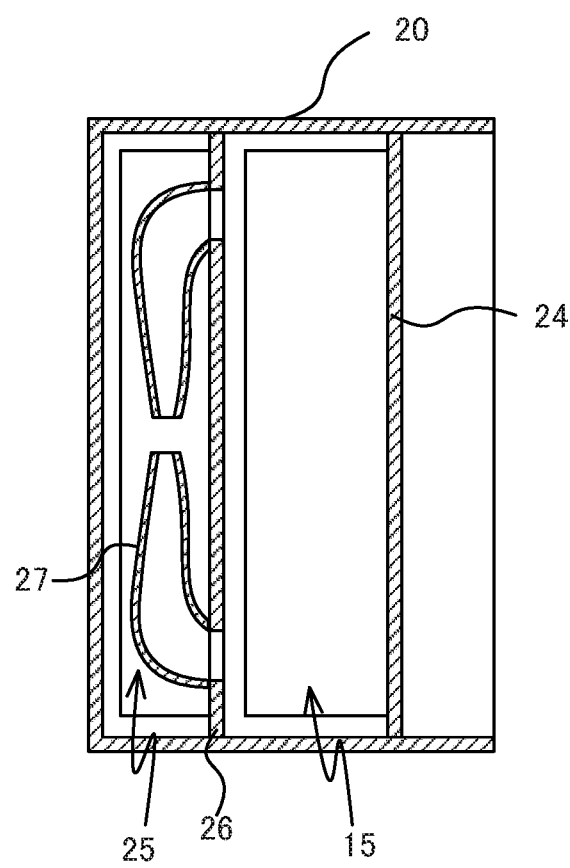
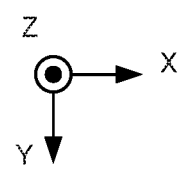

VEHICLE MAIN ELECTRIC MOTOR

TECHNICAL FIELD

The present disclosure relates to a vehicle main electric motor that separates foreign matter from air taken in from the exterior for cooling.

BACKGROUND ART

A main electric motor for driving an electric railway vehicle is installed in a limited space within a bogie. For the main electric motor that has an energy density that enables driving of the electric railway vehicle, an open-type main electric motor is used that supplies cooling air taken in from the exterior to and cools a stator conductor and a rotor conductor that generate heat. A self-ventilating method is used for the open-type main electric motor, by which the cooling air is conducted into the interior of the main electric motor by a cooling fan that is attached to a rotor and rotates with the rotation of the rotor.

In a housing of the open-type main electric motor using the self-ventilating method are formed an air intake port for intake of the cooling air into the housing and an air discharge port for discharging the cooling air from the interior of the housing. An air intake cover equipped with a filter is attached to the air intake port in order to prevent foreign matter such as dust, rain, snow, or the like from entering the interior of the main electric motor. In order to cool the rotor and the stator by cooling air taken into the interior of the housing of the main electric motor by rotation of the cooling fan, and in order to discharge from the air discharge port the cooling air after exchange of heat with the rotor and the stator, efficient intake of the cooling air into the housing is required. Due to the attachment of the filter-equipped air intake cover to the air intake port, periodic cleaning of the filter is required for efficient intake of the cooling air into the interior of the housing over a long period.

A vehicle rotary electric machine disclosed in Patent Literature 1 is equipped with a ventilation filter that separates dust from air by using centrifugal force and inertia. In this vehicle rotary electric machine, contaminated air including dust separated out by a ventilation filter passes through a contaminated air bypass, and is sent to a dust collection chamber equipped with a lid that is closed at normal times, and the dust accumulates in the dust collection chamber.

CITATION LIST

Patent Literature

Patent Literature 1: Unexamined Japanese Patent Application Kokai Publication No. S63-028244

SUMMARY OF INVENTION

Technical Problem

The providing of a filter is not required for the vehicle rotary electric machine disclosed in Patent Literature 1, thereby improving maintainability. However, the interior of the electric motor of the vehicle rotary electric machine disclosed in Patent Literature 1 is at negative pressure due to the rotation of the cooling fan, and thus there is a possibility that the dust accumulated in the dust collection chamber counter-flows back through the bypass and into the interior of the electric motor.

In consideration of the aforementioned circumstances, an objective of the present disclosure is to suppress the counter-flow by foreign matter separated from the air back into the interior of the vehicle main electric motor.

Solution to Problem

In order to attain the aforementioned objective, the vehicle main electric motor of the present disclosure includes: an electric motor to drive a vehicle, a fan, a housing that houses therein the electric motor and the fan, and an air intake port cover. The fan is attached to a rotation shaft of the electric motor and rotates with rotation of the rotation shaft. A housing contains in an interior thereof the electric motor and the fan, and includes, among both end portions in a direction parallel to the rotation shaft of a surface of the housing facing a vehicle body of the vehicle, an air discharge port formed at an end portion facing the fan, to discharge air from the interior, and an air intake port formed at another end portion among both end portions, to intake air into the interior. The air intake port cover includes an opening part to intake air in a direction perpendicular to a travel direction of the vehicle and forms an air flow channel from the opening part to the air intake port; and the air intake port cover has a guide plate, the air discharge port, and the air discharge port cover. The guide plate guides air inflowing from the opening part to the portion facing the vehicle body within the outer perimeter surface of the air intake port cover parallel to the travel direction in the inside of the air flow channel by blocking the space between the opening part and the air intake port to leave an air flow path between the guide plate and a portion of the air intake port cover facing the vehicle body within the outer perimeter surface. The discharge port is formed in the outer perimeter surface to discharge foreign matter included in air inflowing from the opening part and guided by the guide plate. The discharge port cover covers the discharge port, separates the discharge port and the air intake port from each other, and leaves an air flow path from the opening part to the discharge port.

Advantageous Effects of Invention

According to the present disclosure, counter-flow of foreign matter separated from air and entry of the foreign matter into the vehicle main electric motor can be prevented by providing:

an air discharge port cover that covers the discharge port, separates the air intake port and the discharge port from each other, and leaves the air flow path from the opening part to the discharge port.

BRIEF DESCRIPTION OF DRAWINGS

FIG. 6 is a cross-sectional drawing of the air intake port cover according to Embodiment 1;

DESCRIPTION OF EMBODIMENTS

Figure 1:
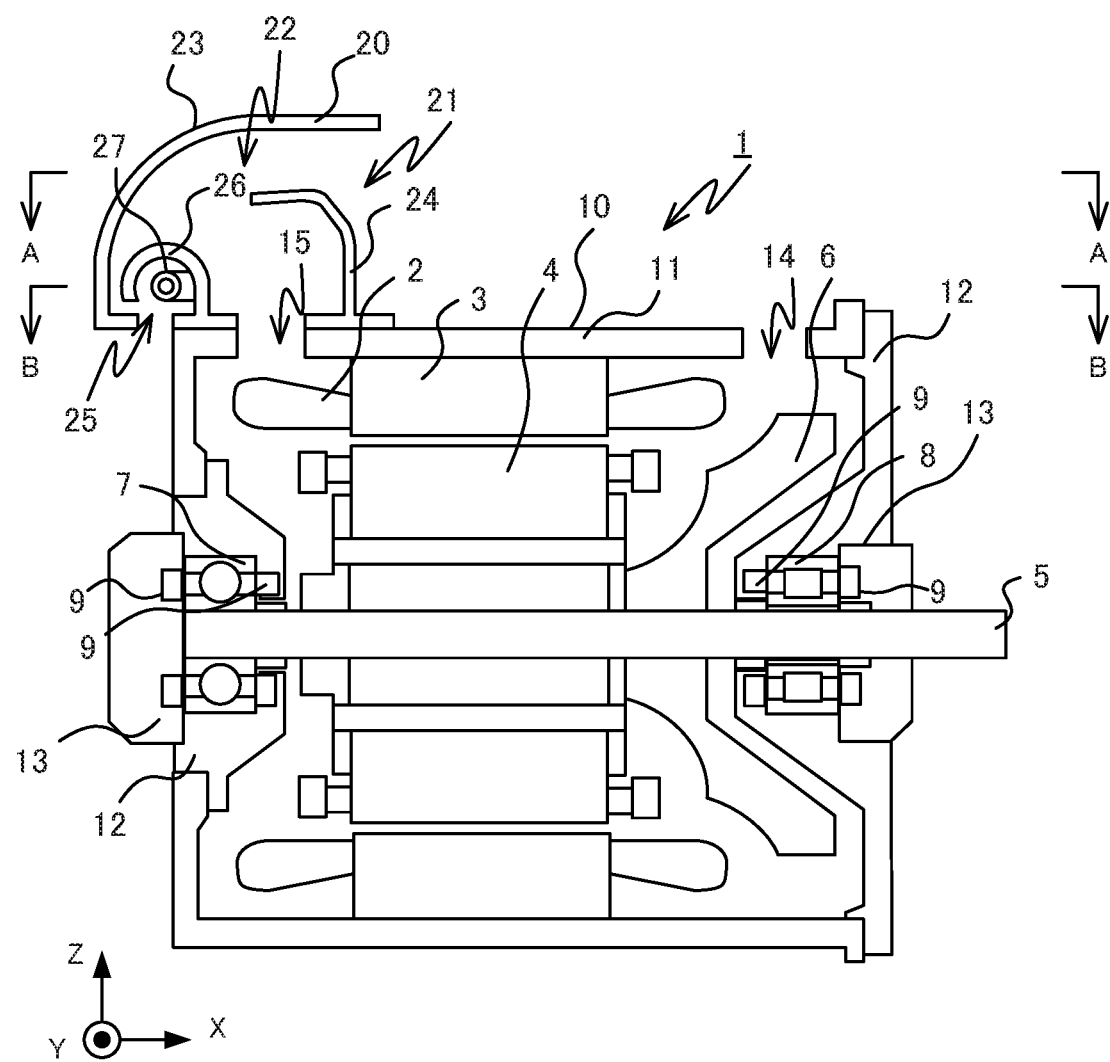
FIG. 1 is a cross-sectional drawing of a vehicle main electric motor according to Embodiment 1 of the present disclosure.

Embodiments of the present description are described below in detail with reference to drawings. In the drawings, components that are the same or equivalent are assigned the same reference sign.

Embodiment 1

Figure 2:
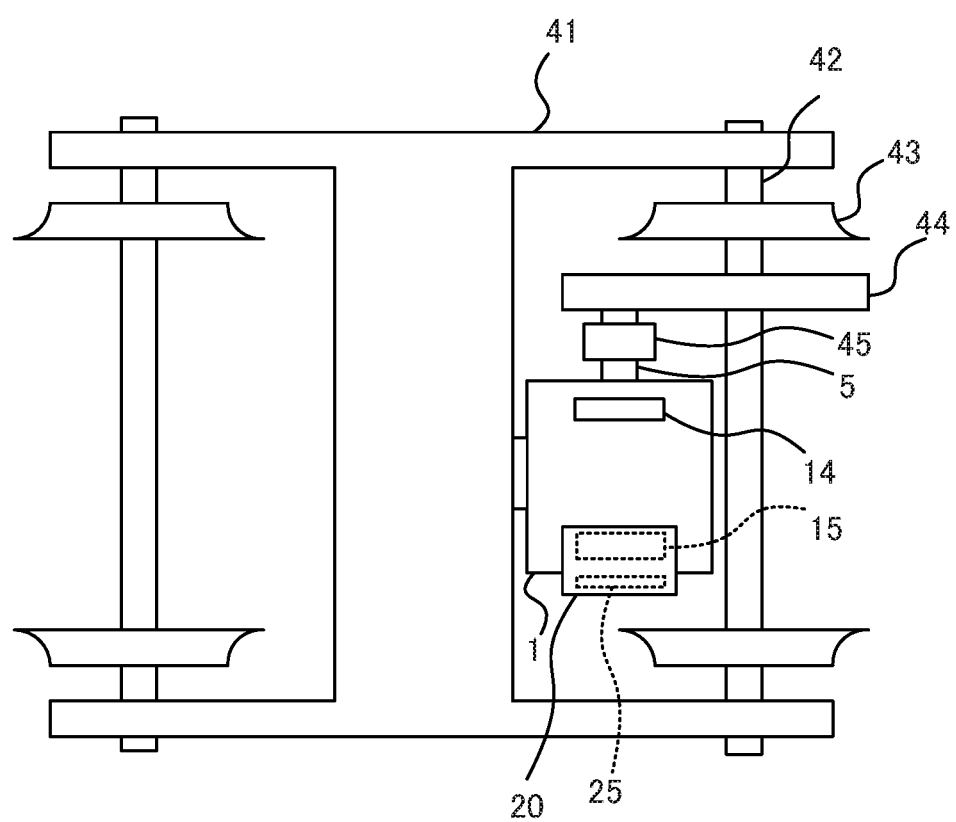
FIG. 2 is a drawing showing an example of a vehicle on which is mounted the vehicle main electric motor according to Embodiment 1.
Figure 3:
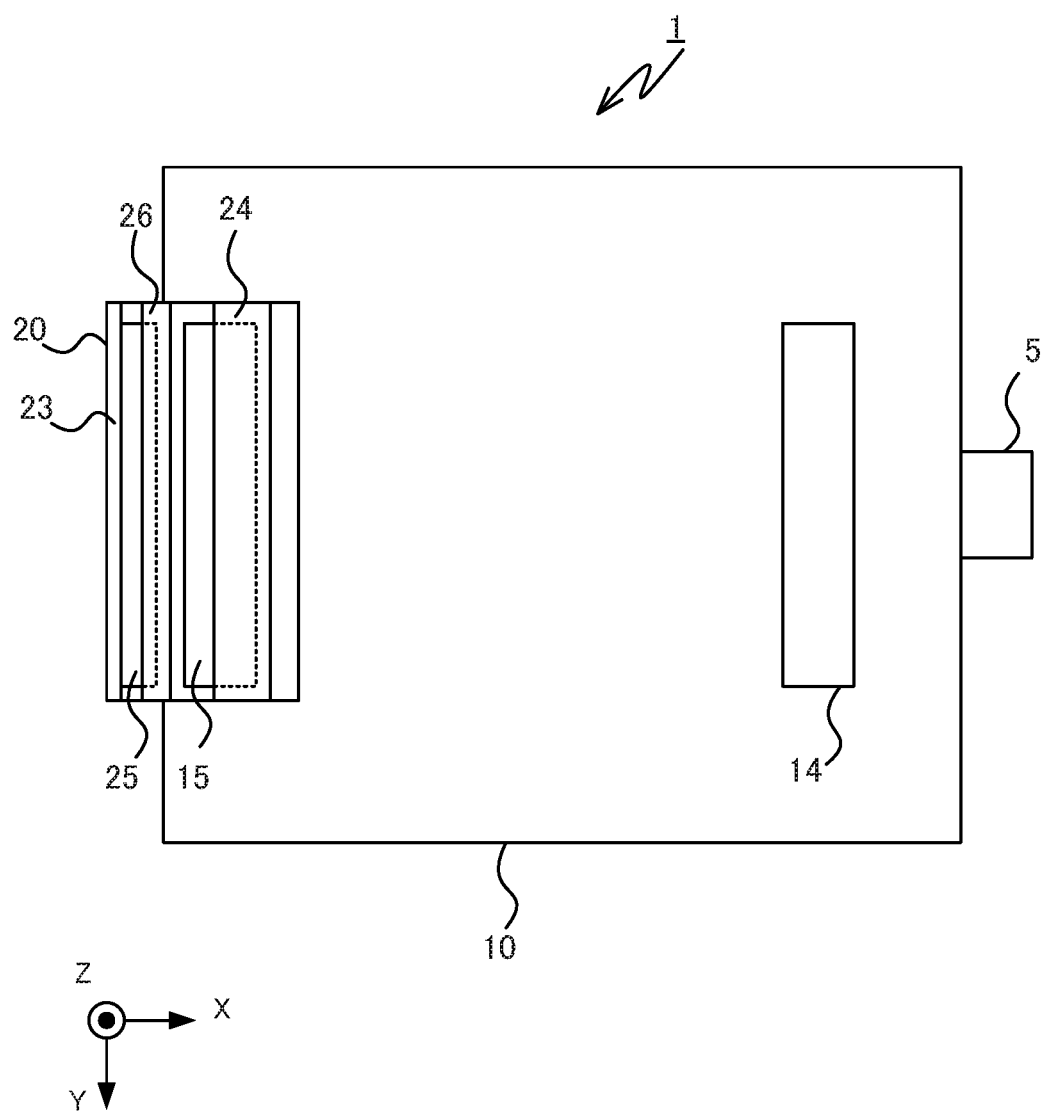
FIG. 3 is a plan view of the vehicle main electric motor according to Embodiment 1.
Figure 4:
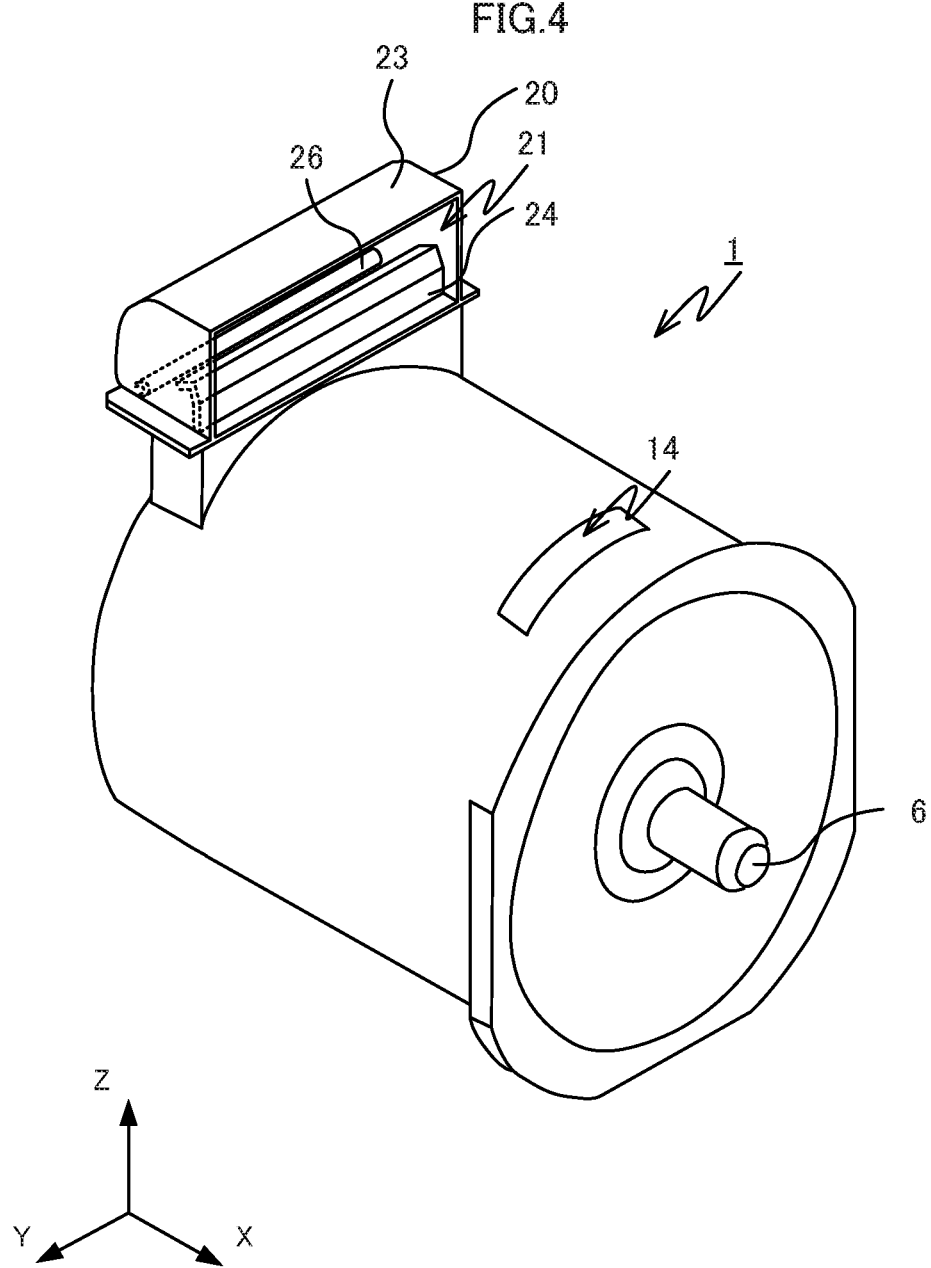
FIG. 4 is a perspective view of the vehicle main electric motor according to Embodiment 1.

FIG. 1 is a cross-sectional drawing of a vehicle main electric motor according to Embodiment 1 of the present disclosure. FIG. 2 is a drawing illustrating an example of a vehicle on which is mounted the vehicle main electric motor according to Embodiment 1. FIG. 3 is a plan drawing of the vehicle main electric motor according to Embodiment 1. FIG. 3 is a cross-sectional drawing taken along the A-A line in FIG. 1. FIG. 4 is a perspective view of the vehicle main electric motor according to Embodiment 1. A vehicle main electric motor 1 (referred to hereinafter as the main electric motor) is mounted on a vehicle such as a railway vehicle. In the example illustrated in FIG. 1 to FIG. 4, the vertical direction is taken to be the Z-axis direction, the travel direction of the vehicle is taken to be the Y-axis direction, and the lateral direction of the vehicle is taken to be the X-axis direction, which is the cross-tie direction in the case of a railway vehicle. The vehicle travels in the Y-axis positive direction or the Y-axis negative direction.

Within a housing 10 of the main electric motor 1 are housed: a stator 3 that has a coil 2; a rotor 4 facing the stator 3; a rotation shaft 5 arranged so as to pass in the X-axis direction through the center of the rotor 4, for transmitting rotation of the rotor 4 to the exterior of the main electric motor 1; a fan 6 attached to the rotation shaft 5 so as to rotate together with the rotor 4; and a ball bearing 7 and a roller bearing 8 that support the rotation shaft 5. A ring-shaped grease pocket 9 centered on the axis of the rotation shaft 5 is arranged in the vicinity of each of the ball bearing 7 and the roller bearing 8. The grease pocket 9 has a freely-selected shape. The housing 10 includes: a frame 11 that surrounds the periphery of the rotation shaft 5, a bearing bracket 12 that rotatably supports the rotation shaft 5, and a bearing cap 13 in which is formed the grease pocket 9.

The main electric motor 1 is mounted on a bogie 41. FIG. 2 is a view of the main electric motor 1 mounted on the bogie 41, as seen from a vehicle body. Driving force from the rotation shaft 5 of the main electric motor 1 is transmitted to a wheel axel 42 through a coupling 45 and a gear 44, and rotates a wheel 43.

Among both end portions in a direction parallel to the rotation shaft 5 of a surface of the housing 10 facing the vehicle body, an air discharge port 14, for discharging air from the interior of the housing 10, is formed in the end portion facing the fan 6, and among the both end portions, in the other end portion is formed an air intake port 15 for intake of air into the interior of the housing 10. At the air intake port 15, an air intake port cover 20 is arranged that has an opening part 21 for inflow of air in a direction perpendicular to the Y axis, and forming an air flow channel 22 from the opening part 21 to the air intake port 15. In Embodiment 1, the opening part 21 is positioned nearer the air discharge port 14 than the air intake port 15 is, and air flows from the air discharge port 14 side, parallel to the X axis, and into the opening part 21. The shape of the opening part 21 is not limited to the above example, and for example, an opening face may tilt toward the air intake port 15 side from a position where the X-axis intersects the opening face, and the opening may be directed to the side opposite to the air discharge port 14.

Figure 5:
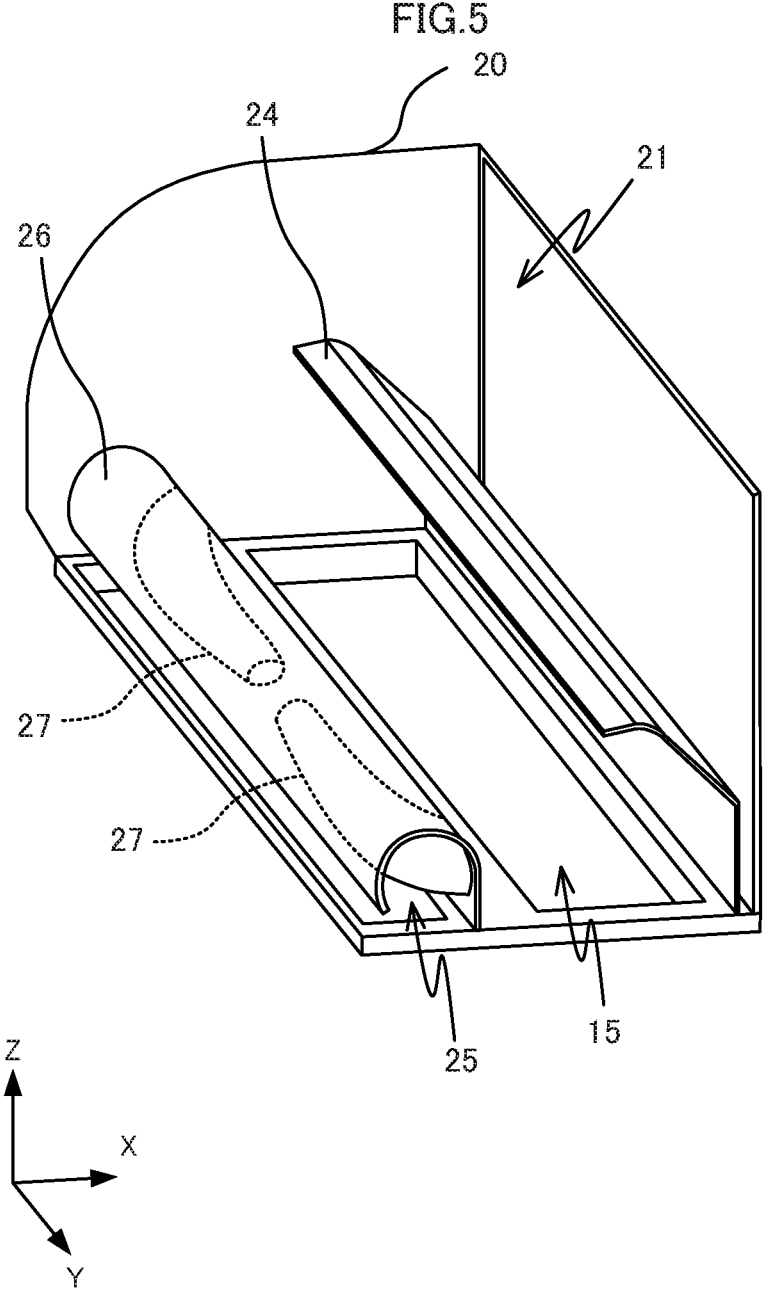
FIG. 5 is a perspective view of an air intake port cover according to Embodiment 1.

FIG. 5 is a perspective view of the air intake port cover according to Embodiment 1. A portion of the air intake port cover 20 is omitted from FIG. 5. FIG. 6 is a cross-sectional drawing of the air intake port cover according to Embodiment 1. FIG. 6 is a cross-sectional drawing taken along the B-B line in FIG. 1. The air intake port cover 20 is equipped with a guide plate 24 that, in the air flow channel 22, guides air inflowing from the opening part 21 to a portion facing the vehicle main body within an outer perimeter surface 23 by leaving an air flow path between the guide plate 24 and the portion facing the vehicle body within the outer perimeter surface 23 of the air intake port cover 20 parallel to the Y-axis direction, and by separating the opening part 21 and the air intake port 15 from each other. In the outer perimeter surface 23 is formed a discharge port 25 that discharges foreign matter such as dust, rain, snow, or the like included in air guided to the outer perimeter surface 23 side by the guide plate 24. The air intake port cover 20 further includes:

a discharge port cover 26 that covers the discharge port 25, separates the discharge port 25 and the air intake port 15 from each other, and leaves an air flow path from the opening part 21 to the discharge port 25; and a pair of cylindrical members 27, connecting at one ends thereof with two holes formed in the discharge port cover 26 and another ends facing each other in the Y-axis direction, that gradually decrease in cross-sectional area from the one ends toward the another ends.

Figure 7:
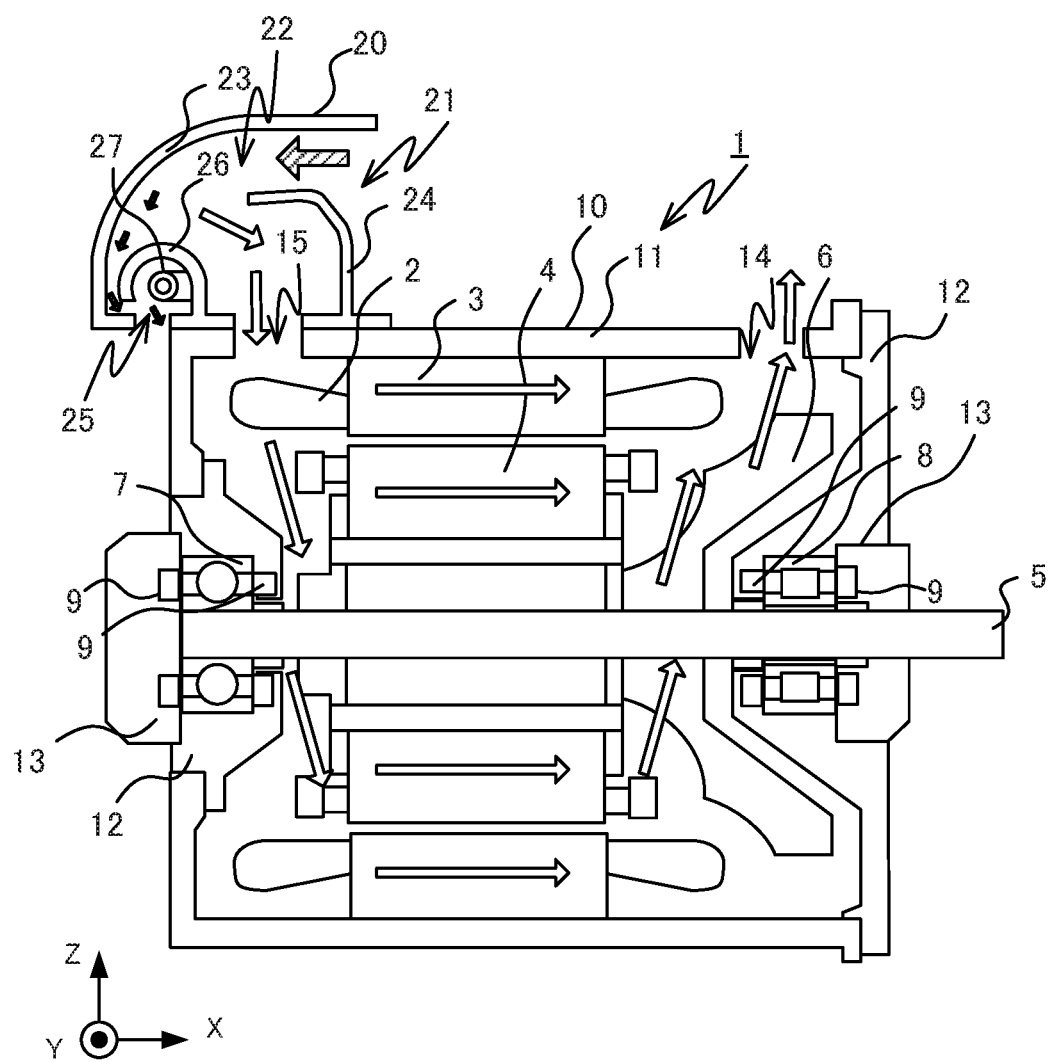
FIG. 7 is a drawing showing flows of air and foreign matter occurring in the vehicle main electric motor according to Embodiment 1.

FIG. 7 is a drawing showing flows of air and foreign matter occurring in the vehicle main electric motor according to Embodiment 1. When pressure of the interior of the housing 10 decreases due to discharge of air of the interior of the housing 10 from the air discharge port 14 due to rotation of the fan 6, as indicated by the hashed arrow, air including the foreign matter flows into the air flow channel 22 from the opening part 21. Due to the guide plate 24, air flowing in from the opening part 21 is guided to, within the outer perimeter surface 23, the portion facing the vehicle body. Due to decrease in pressure of the interior of the housing 10, the air guided to the outer perimeter surface 23 side flows into the housing 10 from the air intake port 15. However, the foreign matter, having a mass greater than that of air, moves along the outer perimeter surface 23 as indicated by the black arrows due to centrifugal force and inertia, and thus is discharged from the discharge port 25. The air flowing in from the air intake port 15 passes between the stator 3 and the rotor 4, and performs heat exchange with the stator 3 and the rotor 4. The air having performed heat exchange with the stator 3 and the rotor 4 is discharged to the exterior of the housing 10 from the air discharge port 14.

Figure 8:
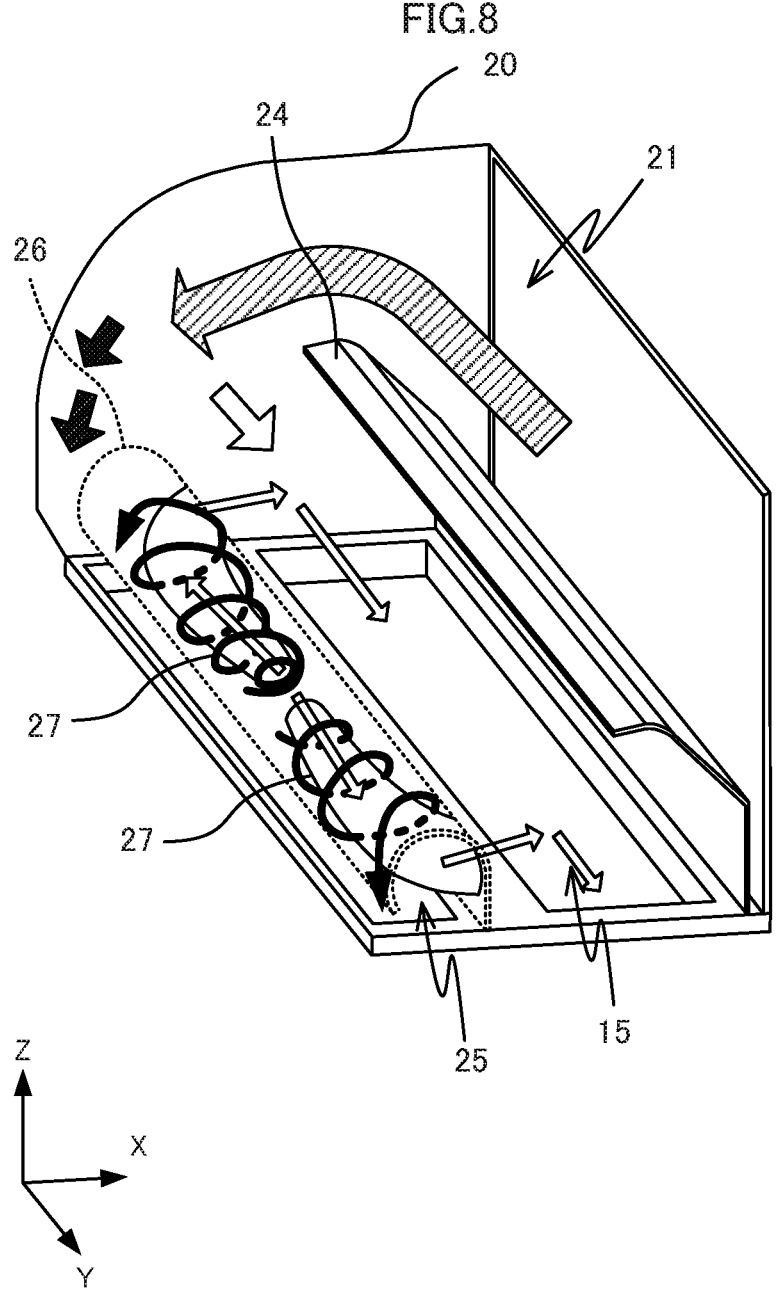
FIG. 8 is a drawing showing flows of air and foreign matter occurring in the air intake port cover according to Embodiment 1.

FIG. 8 is a drawing showing flows of air and foreign matter occurring in the air intake port cover according to Embodiment 1. The structure that prevents counter-flow of separated-out foreign matter is described with reference to FIG. 8. In FIG. 8, the outer perimeter surface 23 is not illustrated, and the discharge port cover 26 is indicated by dashed lines. The separated-out foreign matter is guided to the discharge port 25. Even when pressure of the interior of the housing 10 decreases due to rotation of the fan 6, the discharge port cover 26 is provided that separates the discharge port 25 and the air intake port 15 from each other, thereby enabling prevention of the separated-out foreign matter from being guided toward the air intake port 15. Further, the pair of cylindrical members 27 is provided, one ends of which are connected to holes formed in the discharge port cover 26, another ends of which face each other in the Y-axis direction, and thus the foreign matter is rotated around the cylindrical members 27 and is discharged from the discharge port 25 due to gravity. However, the air flowing in from the opening part 21 and guided to the vicinity of the discharge port 25 passes through the cylindrical members 27 and flows into the housing 10 from the air intake port 15. Due to the cylindrical members 27 being shaped such that cross-sectional area becomes smaller from the ends connected to the discharge port cover 26 to the another ends, inflow of the foreign matter into the cylindrical members 27 can be suppressed, and thus counter-flow of the foreign matter back to the air intake port 15 can be prevented.

In Embodiment 1, the outer perimeter surface 23 includes a surface perpendicular to the Z-axis, a surface perpendicular to the X-axis, and a portion of a cylinder having the Y-axis as a central axis. Further, a portion of the guide plate 24 is a plate-like member tilted toward the air intake port 15 side from a position where a main surface of the plate-like member is perpendicular to the X-axis. The shapes of the outer perimeter surface 23 and the guide plate 24 are not limited to the above-described examples, and these members have any freely-selected shapes that enable separation of foreign matter and air from each other by centrifugal force and inertia. In Embodiment 1, the discharge port 25 is formed, within the outer perimeter surface 23, in the surface perpendicular to the vertical direction, and the discharge port 25 discharges foreign matter by gravity. The location of formation of the discharge port 25 is not limited to the above-described example, and the discharge port 25 may be formed, within the outer perimeter surface 23, in a surface intersecting the vertical direction. In Embodiment 1, the cylindrical member 27 is shaped as a cylinder for which the cross-sectional area decreases from the end connecting to the discharge port cover 26 to the another end. The shape of the cylindrical member 27 is not limited to the above example, and the cylindrical member 27 has a freely-selected cylindrical shape for which the cross-sectional area decreases from the end connecting to the discharge port cover 26 to the another end.

As described above, the main electric motor 1 according to Embodiment 1 of the present disclosure includes the discharge port cover 26 and the pair of cylindrical members 27, one ends of which are connected to the discharge port cover 26, another ends of which face each other in the travel direction of the vehicle, the cylindrical members 27 tapering in cross-sectional area from the one ends to the another ends; and thus back flow of the separated-out foreign matter into the interior of the housing 10 can be suppressed.

Embodiment 2

Figure 9:
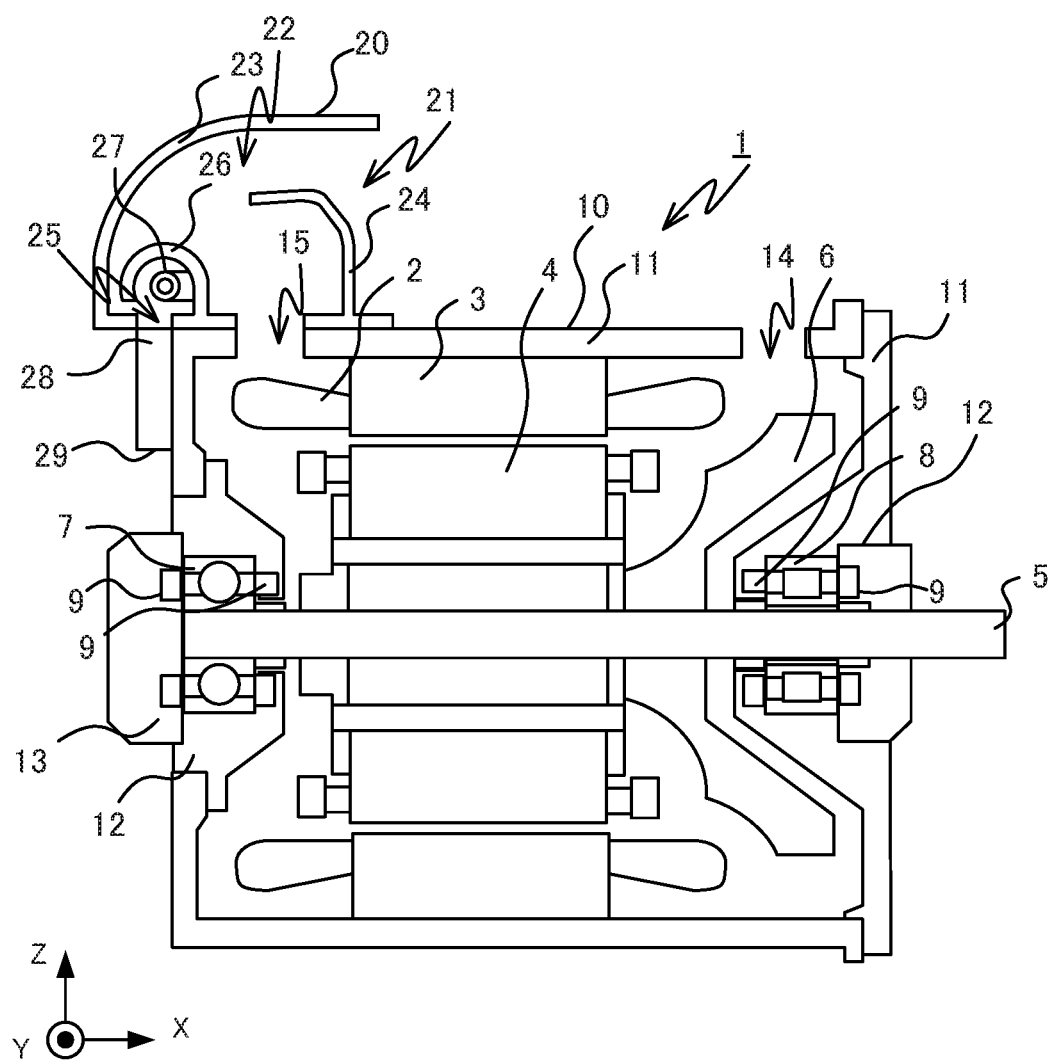
FIG. 9 is a cross-sectional drawing of a vehicle main electric motor according to Embodiment 2 of the present disclosure.

FIG. 9 is a cross-sectional drawing of the vehicle main electric motor according to Embodiment 2 of the present disclosure. The main electric motor 1 according to Embodiment 2, in addition to the structure of the main electric motor 1 according to Embodiment 1, is further equipped with a discharge member 28, one end of which is connected to the discharge port 25. The discharge member 28 is cylindrically shaped, and at another end of the discharge member 28, an exterior discharge port 29 is formed that discharges the foreign matter flowing in from the discharge port 25. Cross-sectional area of the discharge member 28 decreases from the discharge port 25 toward the exterior discharge port 29.

Figure 10:
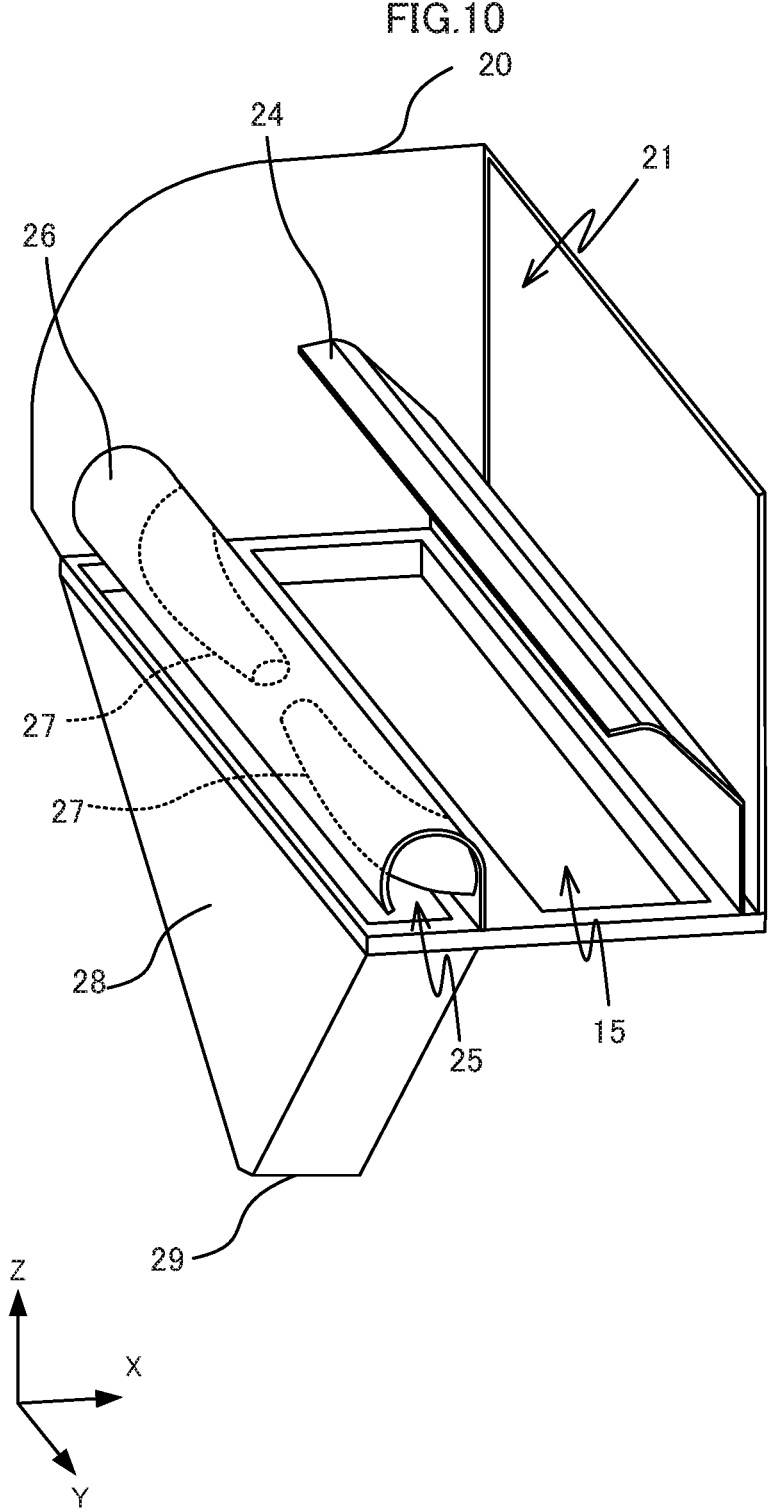
FIG. 10 is a perspective view of an air intake port cover and a discharge member according to Embodiment 2.
Figure 11:
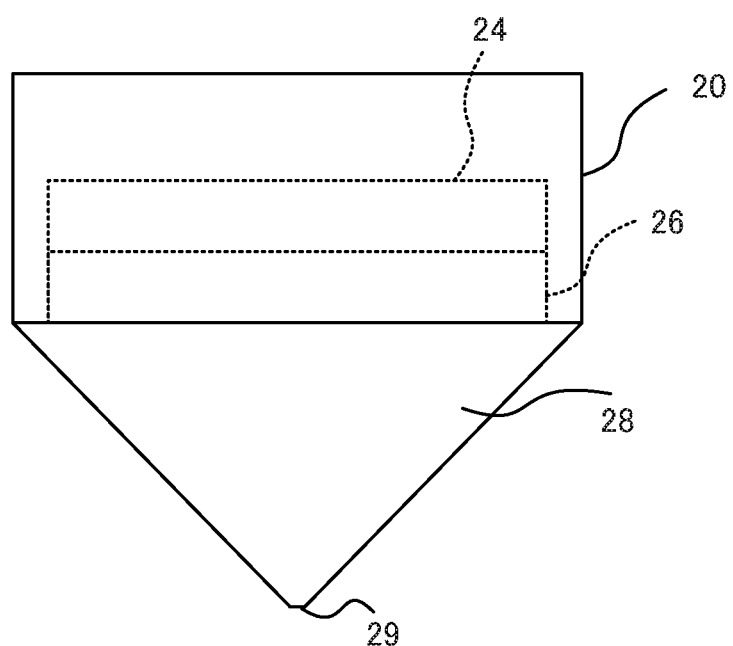
FIG. 11 is a side view of the air intake port cover and the discharge member according to Embodiment 2.

FIG. 10 is a perspective view of an air intake port cover and a discharge member according to Embodiment 2. In FIG. 10, a portion of the air intake port cover 20 is not illustrated. FIG. 11 is a side view of the air intake port cover and the discharge member according to Embodiment 2. X-axis direction width of the discharge member 28 is fixed, and the cross sectional shape of the discharge member 28 perpendicular to the X-axis can be regarded as triangular. Since the cross sectional shape of the discharge member 28 perpendicular to the X-axis can be regarded as triangularly shaped, cross-sectional area of the discharge member 28 decreases from the discharge port 25 toward the exterior discharge port 29. The shape of the discharge member 28 is not limited to the shape of the above described example, and the cross sectional shape of the discharge member 28 perpendicular to the X-axis may be trapezoidal.

Figure 12:
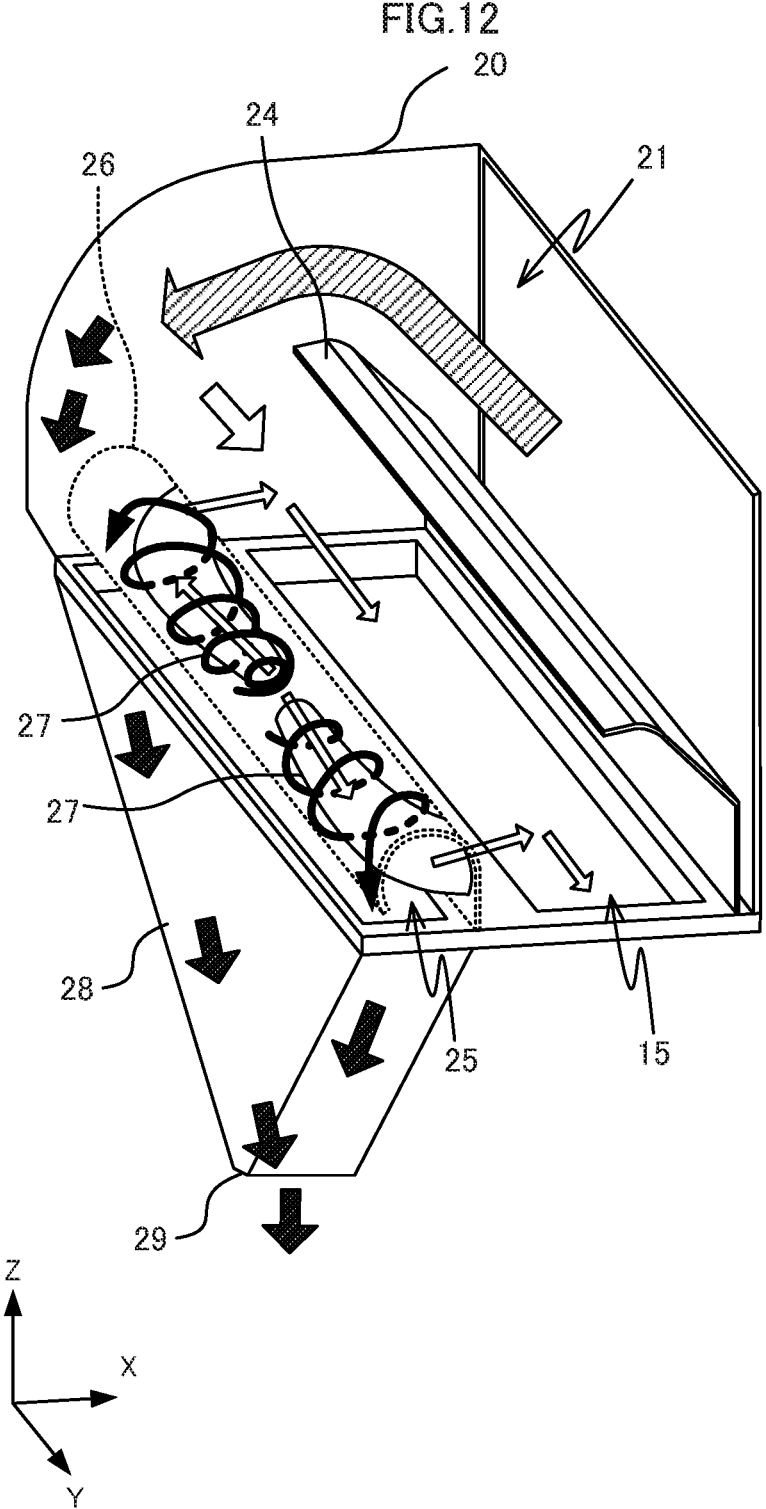
FIG. 12 is a drawing showing flows of air and foreign matter occurring in the air intake port cover and the discharge member according to Embodiment 2.
Figure 13:
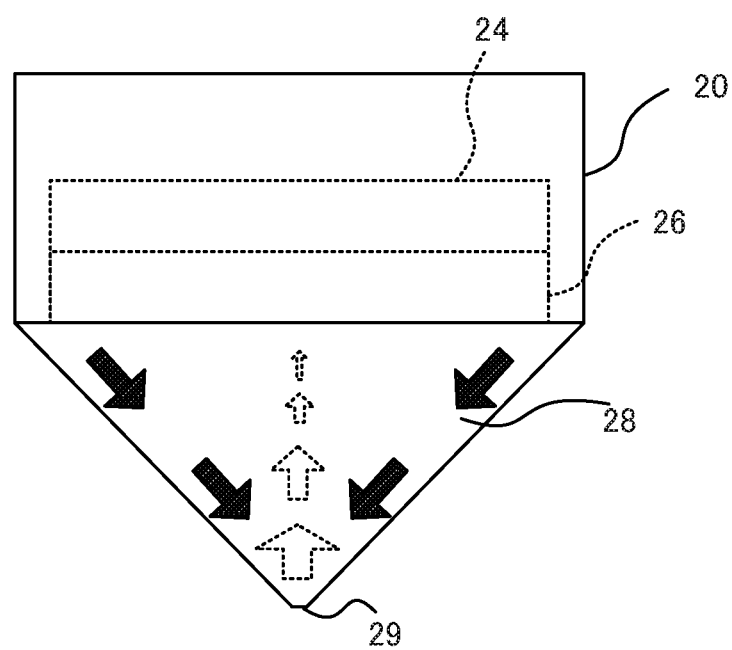
FIG. 13 is a drawing showing flows of air and foreign matter occurring in the discharge member according to Embodiment 2.

FIG. 12 is a drawing showing flows of air and foreign matter occurring in the air intake port cover and the discharge member according to Embodiment 2. FIG. 13 is a drawing showing flows of air and foreign matter occurring in the discharge member according to Embodiment 2. In FIG. 13, air including foreign matter and flowing into the discharge member 28 from the exterior is illustrated by the dashed-line arrows. In the example of FIG. 13, the air including the foreign matter flows into the discharge member 28 from the exterior toward the positive Z-axis direction. Cross-sectional area of the discharge member 28 increases from the exterior discharge port 29 toward the discharge port 25, and thus flow velocity of the air including the foreign matter and flowing into the discharge member 28 from the exterior decreases as the discharge port 25 is approached. Thus even when the fan 6 rotates, pressure of the interior of the housing 10 decreases, and air from the exterior flows into the discharge member 28, suppression is possible of the air flowing into the discharge member 28, passing through the discharge port 25, and then reaching the air intake port 15. Further, by lowering the flow velocity of the air flowing from the exterior into the discharge member 28, the foreign matter can be discharged from the exterior discharge port 29 with high efficiency.

In the aforementioned manner, according to the main electric motor 1 of Embodiment 2 of the present disclosure, the discharge member 28 is arranged for which one end connects to the discharge port 25, and the discharge member 28 decreases in cross-sectional area from the discharge port 25 toward the exterior discharge port 29 at the another end; and thus there is suppression of the arrival at the air intake port 15 of the air that includes the foreign matter and flows in from the exterior by passing through the discharge port 25, and the foreign matter can be discharged with high efficiency.

Embodiment 3

Figure 14:
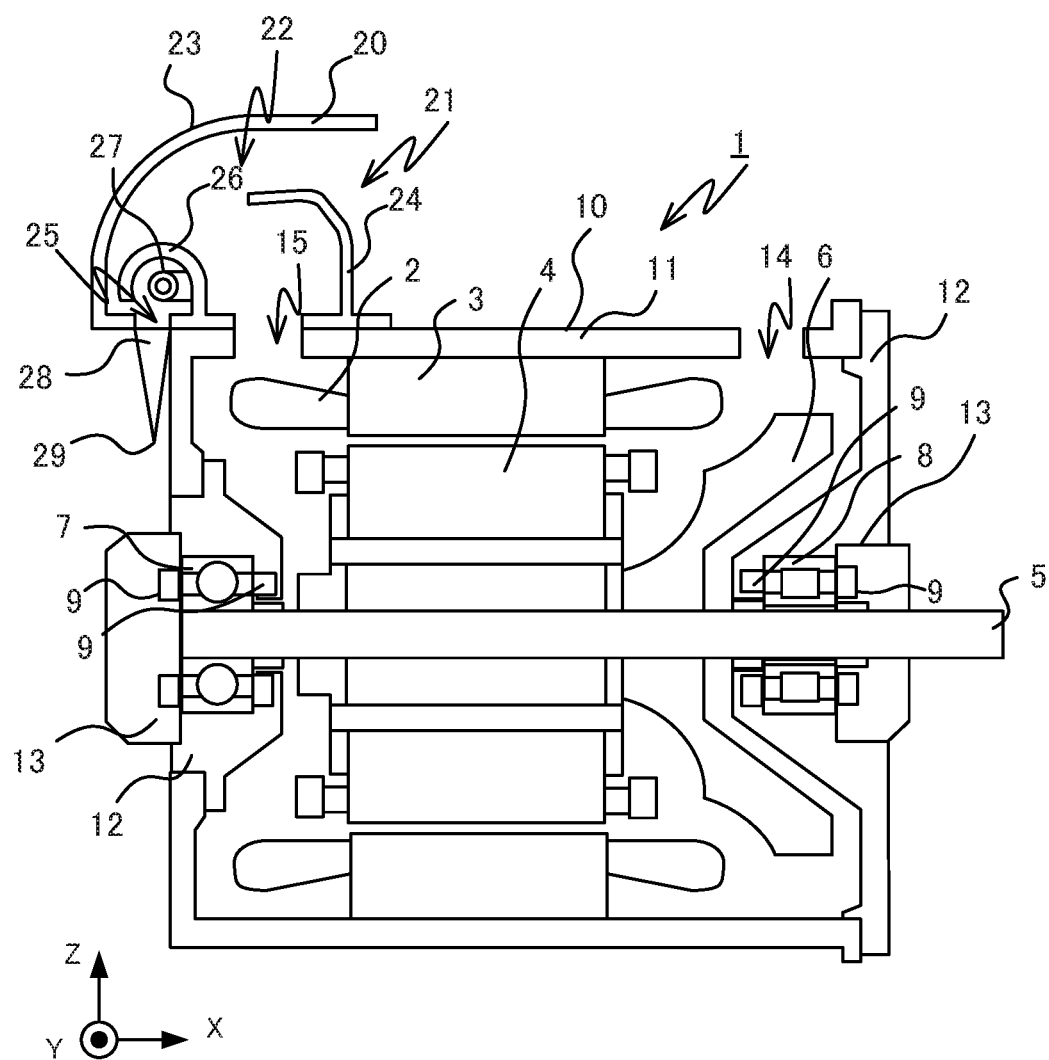
FIG. 14 is a cross-sectional drawing of a vehicle main electric motor according to Embodiment 3 of the present disclosure.
Figure 15:
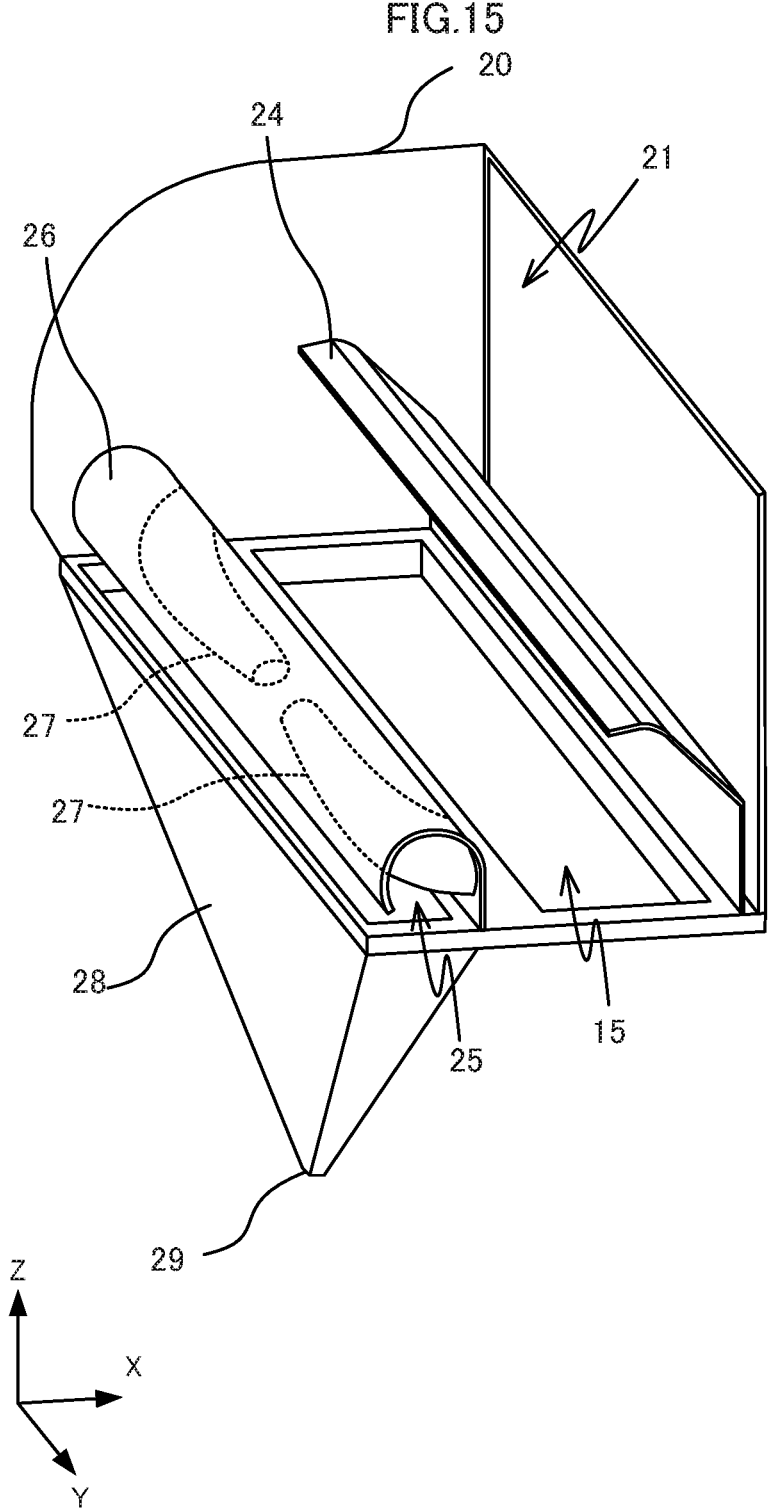
FIG. 15 is a perspective view of an air intake port cover and a discharge member according to Embodiment 3.

FIG. 14 is a cross-sectional drawing of the vehicle main electric motor according to Embodiment 3 of the present disclosure. FIG. 15 is a perspective view of an air intake port cover and a discharge member according to Embodiment 3. The side view of the main electric motor 1 according to Embodiment 3 is similar to that of FIG. 11. The main electric motor 1 according to Embodiment 3 is equipped with the discharge member 28 that has a shape that is different from that of Embodiment 2. In Embodiment 3, the shape of the cross section of the discharge member 28 perpendicular to the X-axis and the shape of the cross section perpendicular to the Y axis can be regarded as triangular, and similarly to Embodiment 2, the cross-sectional area of the discharge member 28 decreases from the discharge port 25 toward the exterior discharge port 29. Thus similarly to Embodiment 2, even when the fan 6 rotates, pressure of the interior of the housing 10 decreases, and air from the exterior flows into the discharge member 28, suppression is possible of the air flowing into the discharge member 28, passing through the discharge port 25, and then reaching the air intake port 15. Further, by lowering the flow velocity of the air flowing from the exterior into the discharge member 28, the foreign matter can be discharged from the exterior discharge port 29 with high efficiency. The shape of the discharge member 28 is not limited to the shape of the above described example, and the shape of the cross section perpendicular to the X axis and the shape of the cross section perpendicular to the Y axis may be trapezoidal.

In the aforementioned manner, according to the main electric motor 1 of Embodiment 3 of the present disclosure, the discharge member 28 is arranged for which one end connects to the discharge port 25, and the discharge member 28 decreases in cross-sectional area from the discharge port 25 toward the exterior discharge port 29 at another end; and thus arrival at the air intake port 15 of the air that includes the foreign matter and flows in from the exterior and passes through the discharge port 25 is suppressed, and the foreign matter can be discharged with high efficiency.

Embodiment 4

Figure 16:
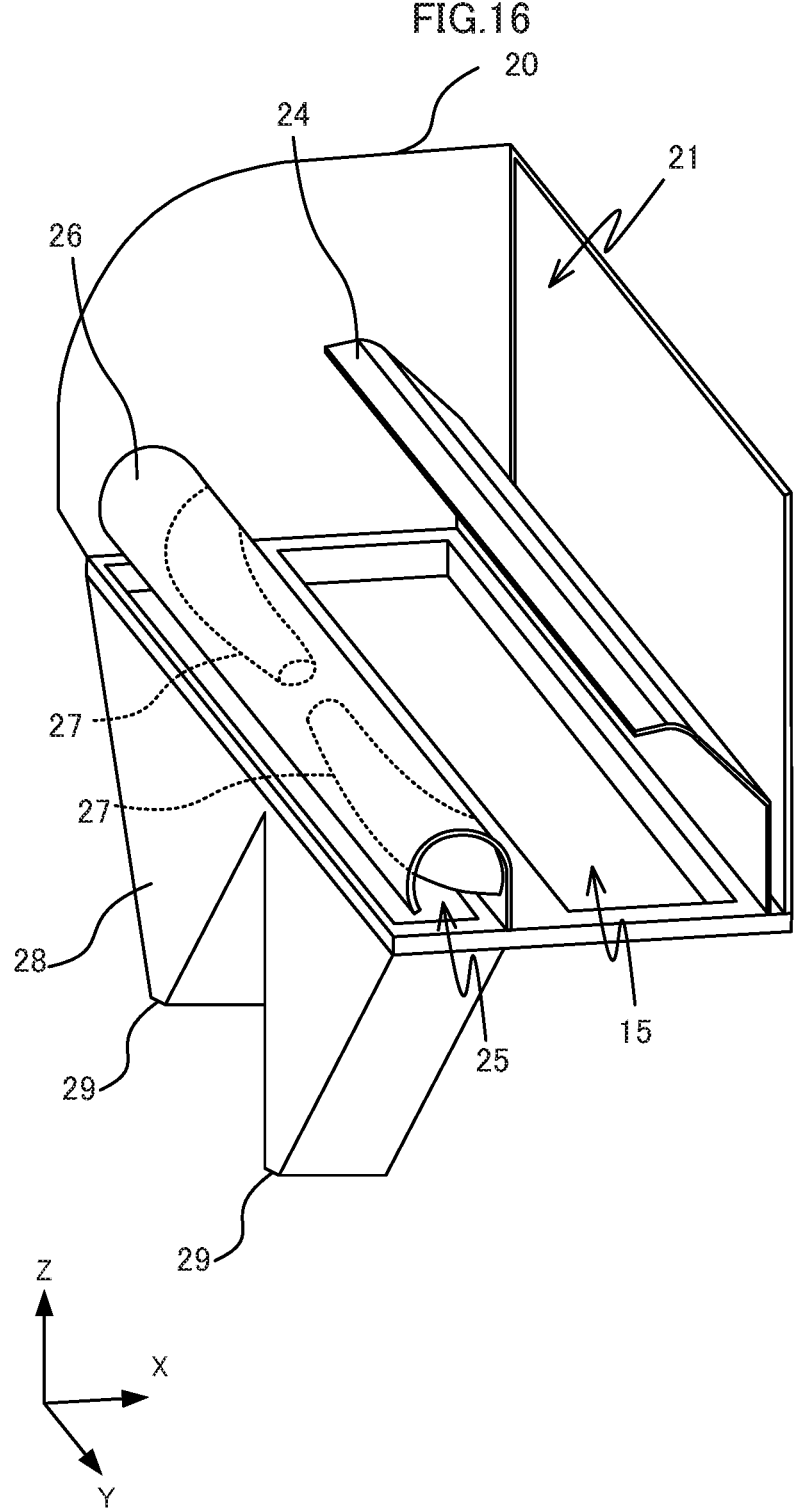
FIG. 16 is a perspective view of an air intake port cover and a discharge member according to Embodiment 4 of the present disclosure.
Figure 17:
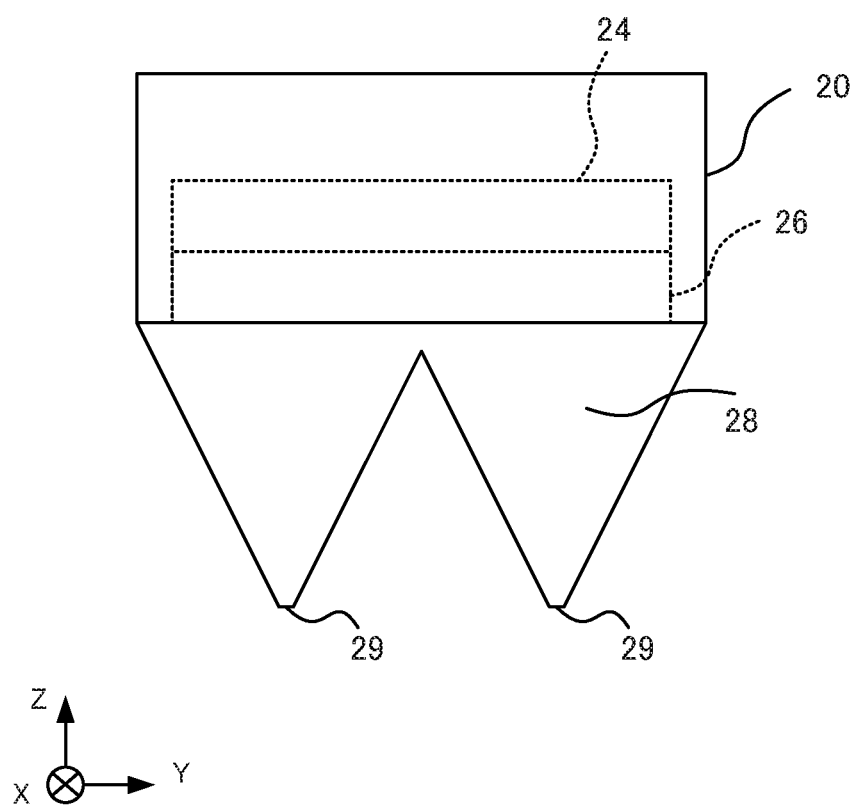
FIG. 17 is a side view of the air intake port cover and the discharge member according to Embodiment 4.

FIG. 16 is a perspective view of an air intake port cover and a discharge member according to Embodiment 4 of the present disclosure. FIG. 17 is a side view of the air intake port cover and the discharge member according to Embodiment 4. The cross-sectional drawing of the main electric motor 1 according to Embodiment 4 is similar to that of FIG. 9. The main electric motor 1 according to Embodiment 4 is equipped with a discharge member 28 that has a shape that is different from that of Embodiments 2 and 3. Two exterior discharge ports 29 are formed in the discharge member 28 in Embodiment 4. X-axis direction width of the discharge member 28 is fixed, the shape of the cross section of the discharge member 28 perpendicular to the X-axis can be regarded as being shaped as two triangles arranged in a row along the Y-axis direction, and similarly to Embodiments 2 and 3, the cross-sectional area of the discharge member 28 decreases from the discharge port 25 toward the exterior discharge ports 29.

Figure 18:
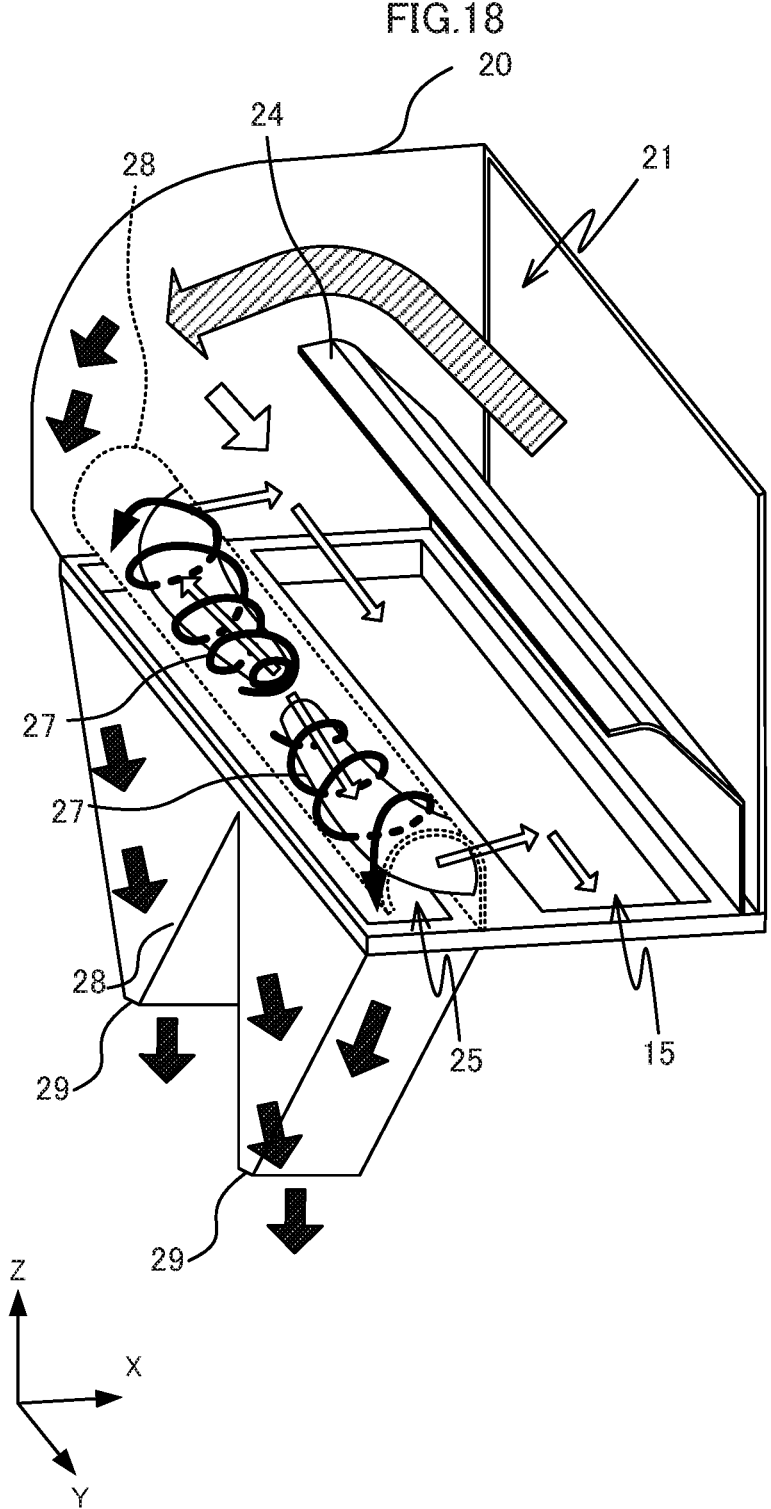
FIG. 18 is a drawing showing flows of air and foreign matter occurring in the air intake port cover and the discharge member according to Embodiment 4.

FIG. 18 is a drawing showing flows of air and foreign matter occurring in the air intake port cover and the discharge member according to Embodiment 4. Similarly to Embodiment 2, the separated-out foreign matter is discharged from each of the two exterior discharge ports 29.

The discharge member 28 decreases in cross-sectional area from the discharge port 25 toward the exterior discharge port 29, and similarly to Embodiment 2 and 3, even when the fan 6 rotates, pressure of the interior of the housing 10 decreases, and air from the exterior flows into the discharge member 28, suppression is possible of the air flowing into the discharge member 28, passing through the discharge port 25, and then reaching the air intake port 15. Further, by lowering the flow velocity of the air flowing from the exterior into the discharge member 28, the foreign matter can be discharged from the exterior discharge port 29 with high efficiency.

In the aforementioned manner, according to the main electric motor 1 of Embodiment 4 of the present disclosure, the discharge member 28 is arranged for which one end connects to discharge port 25, and the discharge member 28 decreases in cross-sectional area from the discharge port 25 toward the exterior discharge port 29 at the another end, and thus there is suppression of arrival at the air intake port 15 of the air that includes the foreign matter and flows in from the exterior by passing through the discharge port 25, and the foreign matter can be discharged with high efficiency.

Embodiment 5

Figure 19:
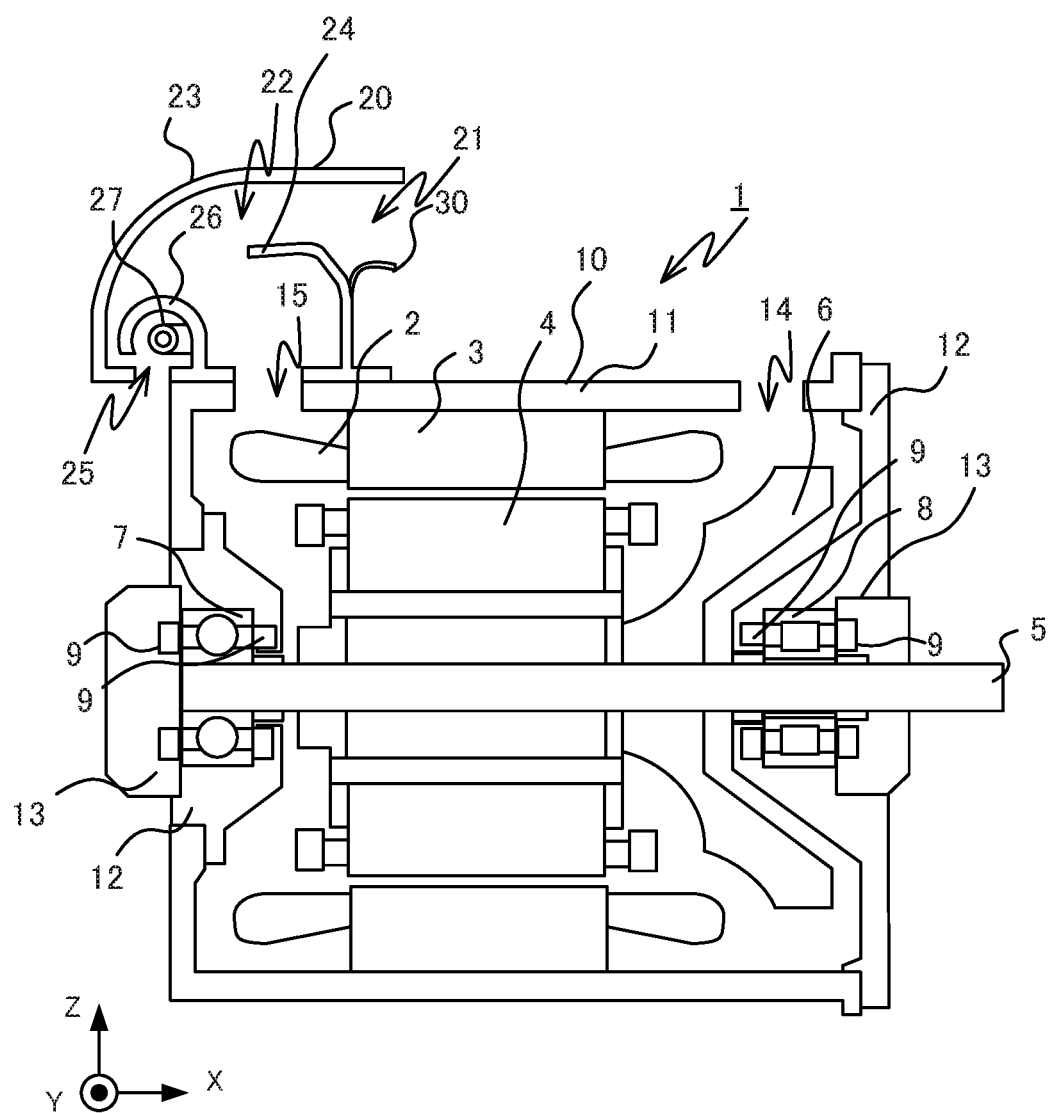
FIG. 19 is a cross-sectional drawing of a vehicle main electric motor according to Embodiment 5 of the present disclosure.

FIG. 19 is a cross-sectional drawing of a vehicle main electric motor according to Embodiment 5 of the present disclosure. The main electric motor 1 according to Embodiment 5, in addition to the structure of the main electric motor 1 according to Embodiment 1, is further equipped with a return plate 30 that is a plate-like member extending in the direction opposite to the flow direction of the air at the opening part 21 occurring from the guide plate 24. By providing of the return plate 30, among the foreign matter having a greater mass than air, the foreign matter having a mass greater than or equal to a fixed value can be prevented from flowing from the opening part 21 into the air flow channel 22.

As described above, according to the main electric motor 1 of Embodiment 5 of the present disclosure, providing of the return plate 30 enables suppression of inflowing of the foreign matter from the opening part 21 to the air flow channel 22.

Embodiment 6

Figure 20:
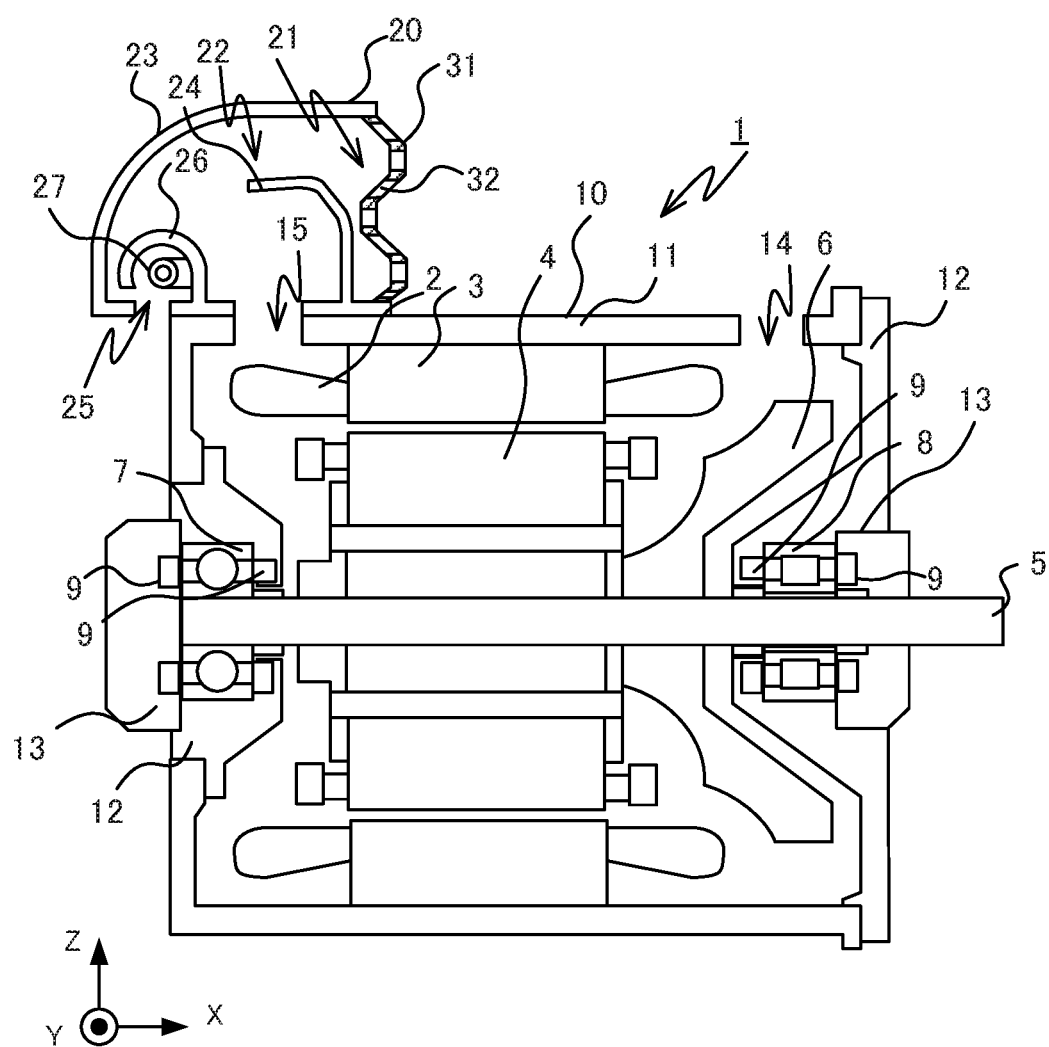
FIG. 20 is a cross-sectional drawing of a vehicle main electric motor according to Embodiment 6 of the present disclosure.
Figure 21:
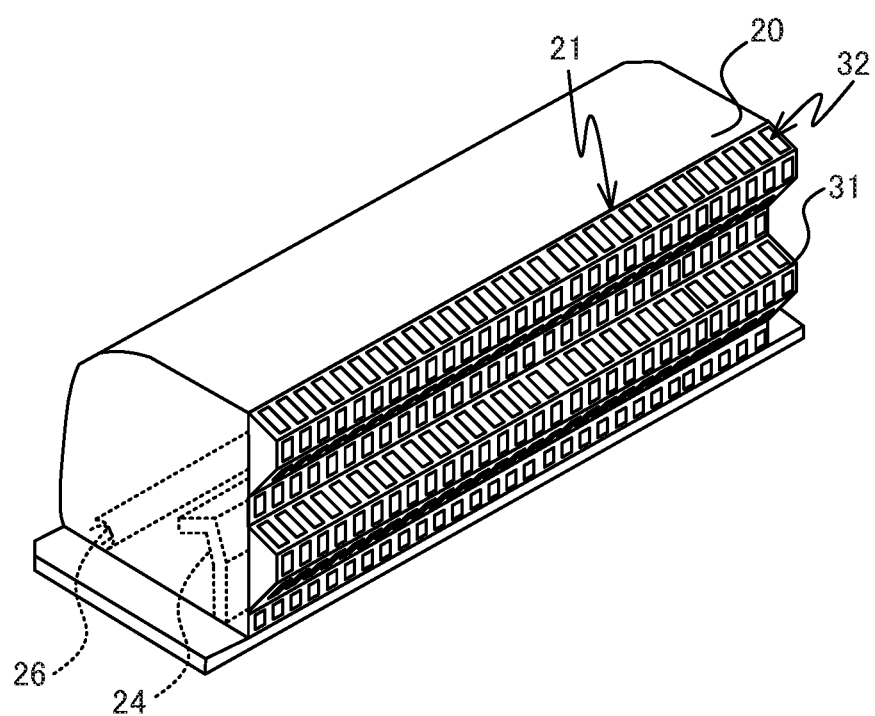
FIG. 21 is a perspective view of an air intake port cover according to Embodiment 6.

FIG. 20 is a cross-sectional drawing of a vehicle main electric motor according to Embodiment 6 of the present disclosure. FIG. 21 is a perspective view of an air intake port cover according to Embodiment 6. In addition to the structure of the main electric motor 1 according to Embodiment 1, the main electric motor 1 according to Embodiment 6 is further equipped with a punch plate 31 that is a plate-like member at the opening part 21 that has a wave-shaped cross section perpendicular to the Y-axis and has through holes 32 for which the through direction is the X-axis direction. Providing of the punch plate 31 enables suppression of inflow into the opening part 21 by foreign matter that has a greater cross-sectional area than that of the through holes 32.

As described above, according to the main electric motor 1 of Embodiment 6 of the present disclosure, providing of the punch plate 31 enables suppression of the inflow into the opening part 21 by foreign matter that has a greater cross-sectional area than that of the through holes 32.

The present disclosure is not limited to the aforementioned embodiments. Configuration is possible by, among the aforementioned embodiments, combining embodiments as desired. For example, the return plate 30 may be provided for the main electric motor 1 according to any one of Embodiments 2 to 4, and the punch plate 31 may be provided for the main electric motor 1 according to any one of Embodiments 2 to 5.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Vehicle main electric motor
2 Coil
3 Stator
4 Rotor
5 Rotation shaft
6 Fan
7 Ball bearing
8 Roller bearing
9 Grease pocket
10 Housing
11 Frame
12 Bearing bracket
13 Bearing cap
14 Air discharge port
15 Air intake port
20 Air intake port cover
21 Opening part
22 Air flow channel
23 Outer perimeter surface
24 Guide plate
25 Discharge port
26 Discharge port cover
27 Cylindrical member
28 Discharge member
29 Exterior discharge port
30 Return plate
31 Punch plate
32 Through hole
41 Bogie
42 Wheel axel
43 Wheel
44 Gear
45 Coupling

The invention claimed is:

1. A vehicle main electric motor comprising:
an electric motor to drive a vehicle;
a fan attached to a rotation shaft of the electric motor, to rotate with rotation of the rotation shaft;
a housing containing in an interior thereof the electric motor and the fan, comprising, among both end portions in a direction parallel to the rotation shaft of a surface of the housing configured to face a vehicle body of the vehicle, (i) an air discharge port formed at an end portion of the housing facing the fan, to discharge air from the interior, and (ii) an air intake port formed at another end portion of the housing among both end portions, to intake air into the interior; and
an air intake port cover comprising an opening part configured to intake air in a direction perpendicular to a travel direction of the vehicle, and forming an air flow channel from the opening part to the air intake port, wherein
the air intake port cover comprises:
(i) a guide plate to guide air inflowing from the opening part to the portion configured to face the vehicle body within an outer perimeter surface of the air intake port cover parallel to the travel direction in the inside of the air flow channel by blocking the space between the opening part and the air intake port to leave an air flow path between the guide plate and a portion of the air intake port cover facing the vehicle body within the outer perimeter surface,
(ii) a discharge port formed in the outer perimeter surface of the air intake port cover to discharge foreign matter included in the air inflowing from the opening part and guided by the guide plate to an outside of the housing, and
(iii) a discharge port cover covering the discharge port, separating the discharge port and the air intake port from each other, and leaving an air flow path from the opening part to the discharge port.

2. The vehicle main electric motor according to claim 1, wherein
the air intake port cover further comprises:
(iv) a pair of cylindrical members, one ends of which are connected to two holes formed in the discharge port cover, another ends of which face each other in the travel direction, the cylindrical members tapering in cross-sectional area from the one ends to the another ends.

3. The vehicle main electric motor according to claim 2, wherein
at the opening part disposed between the air discharge port and the air intake port at a position nearer to the air discharge port than the air intake port, air flows in from the air discharge port side in the direction parallel to the rotation shaft,
a portion of the guide plate is a plate-like member tilted toward the air intake port from a position where a main surface of the plate-like member is perpendicular to the rotation shaft, and due to the plate-like member, air flowing from the opening part is guided to a portion, within the outer perimeter surface, configured to face the vehicle body.

4. The vehicle main electric motor according to claim 3, further comprising:
a cylindrical discharge member, one end thereof connected to the discharge port, an exterior discharge port to discharge the foreign matter flowing in from the discharge port being formed in another end of the cylindrical discharge member, wherein
a cross-sectional area of the discharge member decreases from the discharge port toward to the exterior discharge port.

5. The vehicle main electric motor according to claim 3, further comprising:
a return plate that is a plate-like member extending from the guide plate in a direction opposite to the direction of inflow of air occurring at the opening part.

6. The vehicle main electric motor according to claim 2, further comprising:
a cylindrical discharge member, one end thereof connected to the discharge port, an exterior discharge port to discharge the foreign matter flowing in from the discharge port being formed in another end of the cylindrical discharge member, wherein
a cross-sectional area of the discharge member decreases from the discharge port toward to the exterior discharge port.

7. The vehicle main electric motor according to claim 2, further comprising:
a return plate that is a plate-like member extending from the guide plate in a direction opposite to the direction of inflow of air occurring at the opening part.

8. The vehicle main electric motor according to claim 2, further comprising:
a punch plate in the opening part, the punch plate being a plate-like member having a wave-like shape in a cross section perpendicular to the travel direction, a plurality of through holes being formed in the punch plate, the through holes penetrating the punch plate in the direction parallel to the rotation shaft.

9. The vehicle main electric motor according to claim 1, wherein
at the opening part disposed between the air discharge port and the air intake port at a position nearer to the air discharge port than the air intake port, air flows in from the air discharge port side in the direction parallel to the rotation shaft,
a portion of the guide plate is a plate-like member tilted toward the air intake port from a position where a main surface of the plate-like member is perpendicular to the rotation shaft, and due to the plate-like member, air flowing from the opening part is guided to a portion, within the outer perimeter surface, configured to face the vehicle body.

10. The vehicle main electric motor according to claim 9, further comprising:
a cylindrical discharge member, one end thereof connected to the discharge port, an exterior discharge port to discharge the foreign matter flowing in from the discharge port being formed in another end of the cylindrical discharge member, wherein
a cross-sectional area of the discharge member decreases from the discharge port toward to the exterior discharge port.

11. The vehicle main electric motor according to claim 9, further comprising:
a return plate that is a plate-like member extending from the guide plate in a direction opposite to the direction of inflow of air occurring at the opening part.

12. The vehicle main electric motor according to claim 9, further comprising:
a punch plate in the opening part, the punch plate being a plate-like member having a wave-like shape in a cross section perpendicular to the travel direction, a plurality of through holes being formed in the punch plate, the through holes penetrating the punch plate in the direction parallel to the rotation shaft.

13. The vehicle main electric motor according to claim 1, further comprising:
a cylindrical discharge member, one end thereof connected to the discharge port, an exterior discharge port to discharge the foreign matter flowing in from the discharge port being formed in another end of the cylindrical discharge member, wherein
a cross-sectional area of the discharge member decreases from the discharge port toward to the exterior discharge port.

14. The vehicle main electric motor according to claim 13, wherein
a width of the discharge member in the direction parallel to the rotation shaft is fixed, and
a cross-sectional shape of the discharge member perpendicular to the rotation shaft can be regarded as triangular.

15. The vehicle main electric motor according to claim 13, wherein
a cross-sectional shape of the discharge member perpendicular to the rotation shaft and a cross-sectional shape of the discharge member perpendicular to the travel direction can be regarded as triangular.

16. The vehicle main electric motor according to claim 13, wherein
the exterior discharge port is two of the exterior discharge ports formed at the another end of the discharge member,
a width of the discharge member parallel to the rotation shaft is fixed, and
a cross-sectional shape of the discharge member perpendicular to the rotation shaft can be regarded as two triangles arranged in a row along the travel direction.

17. The vehicle main electric motor according to claim 13, further comprising:
a return plate that is a plate-like member extending from the guide plate in a direction opposite to the direction of inflow of air occurring at the opening part.

18. The vehicle main electric motor according to claim 13, further comprising:
a punch plate in the opening part, the punch plate being a plate-like member having a wave-like shape in a cross section perpendicular to the travel direction, a plurality of through holes being formed in the punch plate, the through holes penetrating the punch plate in the direction parallel to the rotation shaft.

19. The vehicle main electric motor according to claim 1, further comprising:
a return plate that is a plate-like member extending from the guide plate in a direction opposite to the direction of inflow of air occurring at the opening part.

20. The vehicle main electric motor according to claim 1, further comprising:
  a punch plate in the opening part, the punch plate being a plate-like member having a wave-like shape in a cross section perpendicular to the travel direction, a plurality of through holes being formed in the punch plate, the through holes penetrating the punch plate in the direction parallel to the rotation shaft.

\* \* \* \* \*